(12) United States Patent
Sun et al.

(10) Patent No.: US 12,052,694 B2
(45) Date of Patent: Jul. 30, 2024

(54) CONFIGURING CELLULAR SIDELINK RESOURCES IN A FLEXIBLE MANNER

(71) Applicant: Apple Inc., Cupertino, CA (US)

(72) Inventors: Haitong Sun, Irvine, CA (US); Wei Zeng, San Diego, CA (US); Chunxuan Ye, San Diego, CA (US); Yushu Zhang, Beijing (CN); Dawei Zhang, Saratoga, CA (US); Zhibin Wu, Los Altos, CA (US); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 17/442,120

(22) PCT Filed: Aug. 5, 2020

(86) PCT No.: PCT/CN2020/107118
§ 371 (c)(1),
(2) Date: Sep. 22, 2021

(87) PCT Pub. No.: WO2022/027317
PCT Pub. Date: Feb. 10, 2022

(65) Prior Publication Data
US 2022/0303962 A1    Sep. 22, 2022

(51) Int. Cl.
*H04W 72/044* (2023.01)
*H04L 5/00* (2006.01)
(Continued)

(52) U.S. Cl.
CPC ......... *H04W 72/044* (2013.01); *H04L 5/0094* (2013.01); *H04W 72/23* (2023.01); *H04W 92/18* (2013.01)

(58) Field of Classification Search
CPC ... H04W 72/044; H04W 72/23; H04W 92/18; H04W 72/0453; H04L 5/0094; H04L 5/0041; H04L 5/003
See application file for complete search history.

(56) References Cited

U.S. PATENT DOCUMENTS

2020/0196353 A1\* 6/2020 Zhang .................. H04W 4/023
2020/0314804 A1\* 10/2020 Shin ..................... H04L 5/0055
(Continued)

FOREIGN PATENT DOCUMENTS

CN    110024322        7/2019
CN    110753355 A      2/2020
(Continued)

OTHER PUBLICATIONS

International Search Report for PCT Patent Application No. PCT/CN2020/107118; mailed Apr. 29, 2021.
(Continued)

*Primary Examiner* — Jung H Park
(74) *Attorney, Agent, or Firm* — Kowert, Hood, Munyon, Rankin & Goetzel, P.C.

(57) ABSTRACT

Embodiments are presented herein of apparatuses, systems, and methods for configuring cellular sidelink resources in a flexible manner. A cellular base station may select a cellular sidelink resource pool. The cellular sidelink resource pool may include non-contiguous frequency resources. The cellular base station may provide cellular sidelink resource pool configuration information to a wireless device. The cellular sidelink resource pool configuration information may configure the cellular sidelink resource pool that includes non-contiguous frequency resources.

20 Claims, 12 Drawing Sheets

(51) Int. Cl.
*H04W 72/23* (2023.01)
*H04W 92/18* (2009.01)

(56) References Cited

U.S. PATENT DOCUMENTS

2021/0345300 A1* 11/2021 Selvanesan ............. H04L 5/001
2023/0081131 A1* 3/2023 Selvanesan ......... H04W 74/002
    370/329
2023/0084999 A1* 3/2023 Selvanesan ........... H04W 72/02
    370/329

FOREIGN PATENT DOCUMENTS

| CN | 110999335 A | 4/2020 |
| CN | 111432482 A | 7/2020 |
| WO | 2019195151 A1 | 10/2019 |
| WO | 2020148264 A1 | 7/2020 |

OTHER PUBLICATIONS

OPPO "Phyical layer structure for NR-V2X"; 3GPP TSG RAN WG1 #98bis R1-1910372; Oct. 20, 2019.
Office Action for CN Patent Application No. 202080104333.2; Apr. 22, 2024.

* cited by examiner

Bitmap={1, 0, 0, 1}

|   |                |                |                |                |
|---|----------------|----------------|----------------|----------------|
| 3 | Resource Unit  | Resource Unit  | Resource Unit  | Resource Unit  |
| 2 | Resource Unit  | Resource Unit  | Resource Unit  | Resource Unit  |
| 1 | Resource Unit  | Resource Unit  | Resource Unit  | Resource Unit  |
| 0 | Resource Unit  | Resource Unit  | Resource Unit  | Resource Unit  |

FIG. 9

Bitmap={1, 0}, M=K=2

|   |                |                |                |                |
|---|----------------|----------------|----------------|----------------|
| 3 | Resource Unit  | Resource Unit  | Resource Unit  | Resource Unit  |
| 2 | Resource Unit  | Resource Unit  | Resource Unit  | Resource Unit  |
| 1 | Resource Unit  | Resource Unit  | Resource Unit  | Resource Unit  |
| 0 | Resource Unit  | Resource Unit  | Resource Unit  | Resource Unit  |

FIG. 10

M=K=2
M bit bitmap = {1, 1}
K bit bitmap = {1, 0}

| | | | | |
|---|---|---|---|---|
| 3 | Resource Unit | Resource Unit | Resource Unit | Resource Unit |
| 2 | Resource Unit | Resource Unit | Resource Unit | Resource Unit |
| 1 | Resource Unit | Resource Unit | Resource Unit | Resource Unit |
| 0 | Resource Unit | Resource Unit | Resource Unit | Resource Unit |

*FIG. 11*

CONFIGURING CELLULAR SIDELINK RESOURCES IN A FLEXIBLE MANNER

FIELD

The present application relates to wireless devices, and more particularly to apparatuses, systems, and methods for a cellular base station to configure cellular sidelink resources in a flexible manner.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

V2X communication has potential to be a source of increasing demand and range of envisioned uses of wireless communication, which may present a variety of design and development challenges. Accordingly, improvements in the field in support of such development and design are desired.

In addition to V2X communication, there is an increasingly wide range of desired device complexities, capabilities, traffic patterns, and other characteristics associated with wireless communication, including in the area of device-to-device communications. Accordingly, it would be desirable to recognize and provide improved support for a broad range of desired wireless communication characteristics, potentially including providing improved support for device-to-device communication techniques. Therefore, improvements in the field are desired.

SUMMARY

Embodiments are presented herein of apparatuses, systems, and methods for configuring cellular sidelink resources in a flexible manner.

According to the techniques described herein, a cellular base station may select a resource pool for cellular sidelink communication, and may provide cellular sidelink configuration information indicating the selected resource pool to one or more wireless devices. The resources included in the resource pool may be flexibly selected, potentially including selection of non-contiguous frequency resources.

The cellular base station may also select a resource unit configuration for the cellular sidelink resource pool. The resource unit configuration could include configuring "super resource units" that aggregate multiple frequency sub-channels and/or time slots, which may include non-contiguous time and/or frequency resources. The cellular sidelink configuration information provided to the wireless device(s) may also indicate the super resource unit configuration for the cellular sidelink resource pool, e.g., if applicable.

Additionally, it may be the case that the cellular base station can configure a cellular sidelink control channel for use in conjunction with the cellular sidelink resource pool in a flexible manner. For example, the cellular base station could select a cellular sidelink control channel configuration that allows the cellular sidelink control channel to be transmitted using non-contiguous frequency resources, resources from multiple time slots, and/or resources from multiple frequency sub-channels. The cellular sidelink configuration information provided to the wireless device(s) may also indicate the cellular sidelink control channel configuration for the cellular sidelink resource pool, at least according to some embodiments.

Note that the techniques described herein may be implemented in and/or used with a number of different types of devices, including but not limited to, base stations, access points, cellular phones, portable media players, tablet computers, accessory and/or wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9-11 illustrate aspects of exemplary possible techniques for configuring a resource pool for cellular sidelink communication that is non-contiguous in the frequency domain, according to some embodiments.

Figure 1:
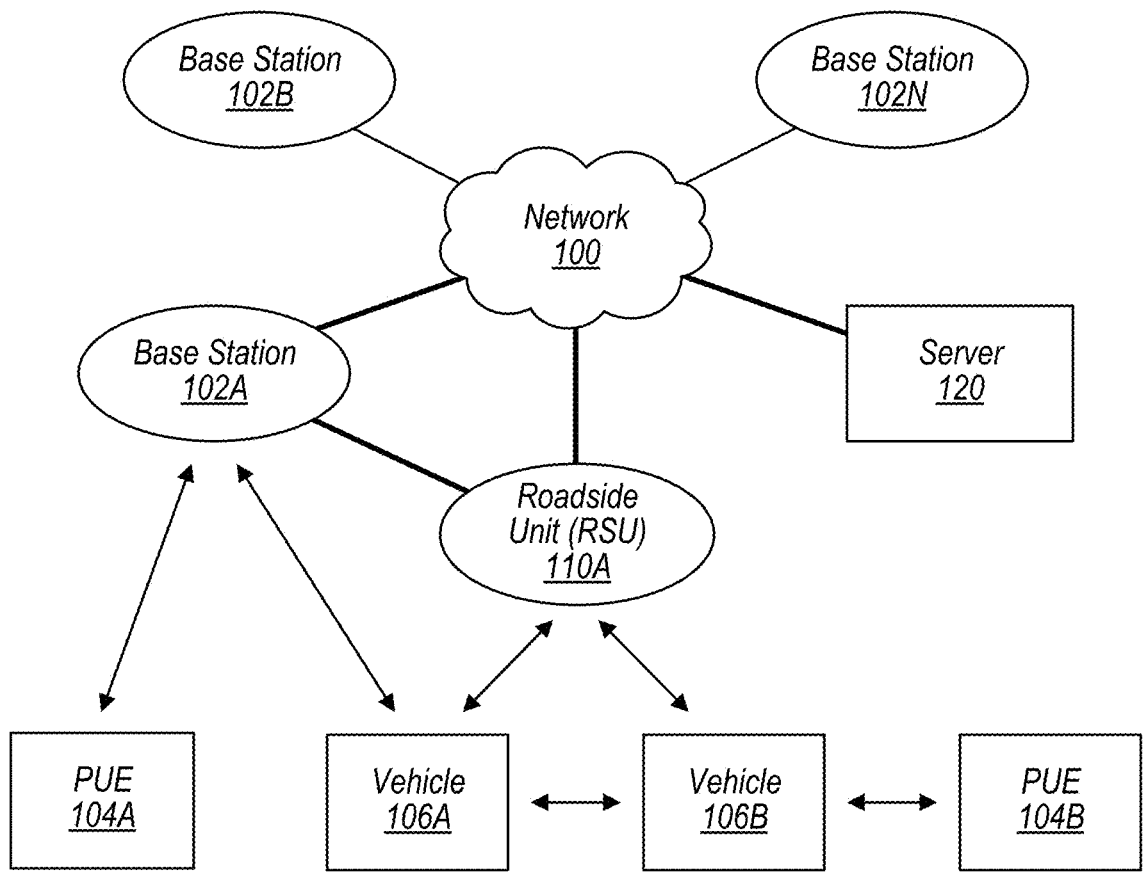
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™, Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements include, for example, processors and associated memory, portions or circuits of individual processor cores, entire processor cores, individual processors, circuits such as an ASIC (Application Specific Integrated Circuit), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB. Note that if the base station 102A is implemented in the context of NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication among user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication among user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
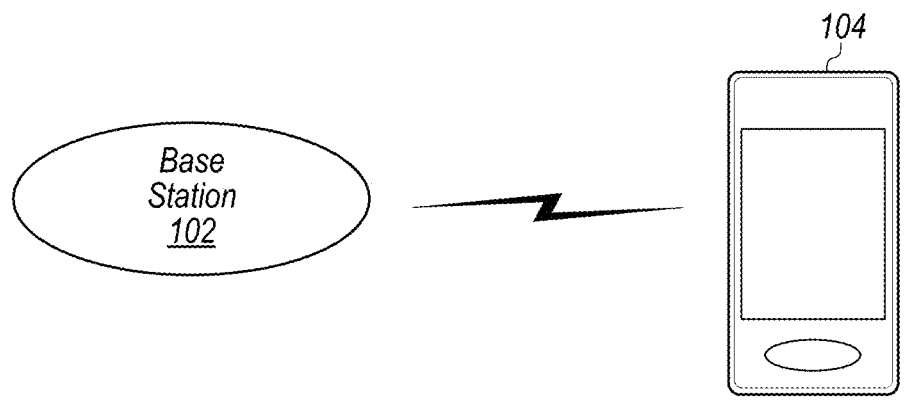
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a tablet, or any other type of hand-held device, a smart watch or other wearable device, a media player, a computer, a laptop, an unmanned aerial vehicle (UAV), an unmanned aerial controller (UAC), an automobile, or virtually any type of wireless device.

The UE 104 may include a processor (processing element) that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
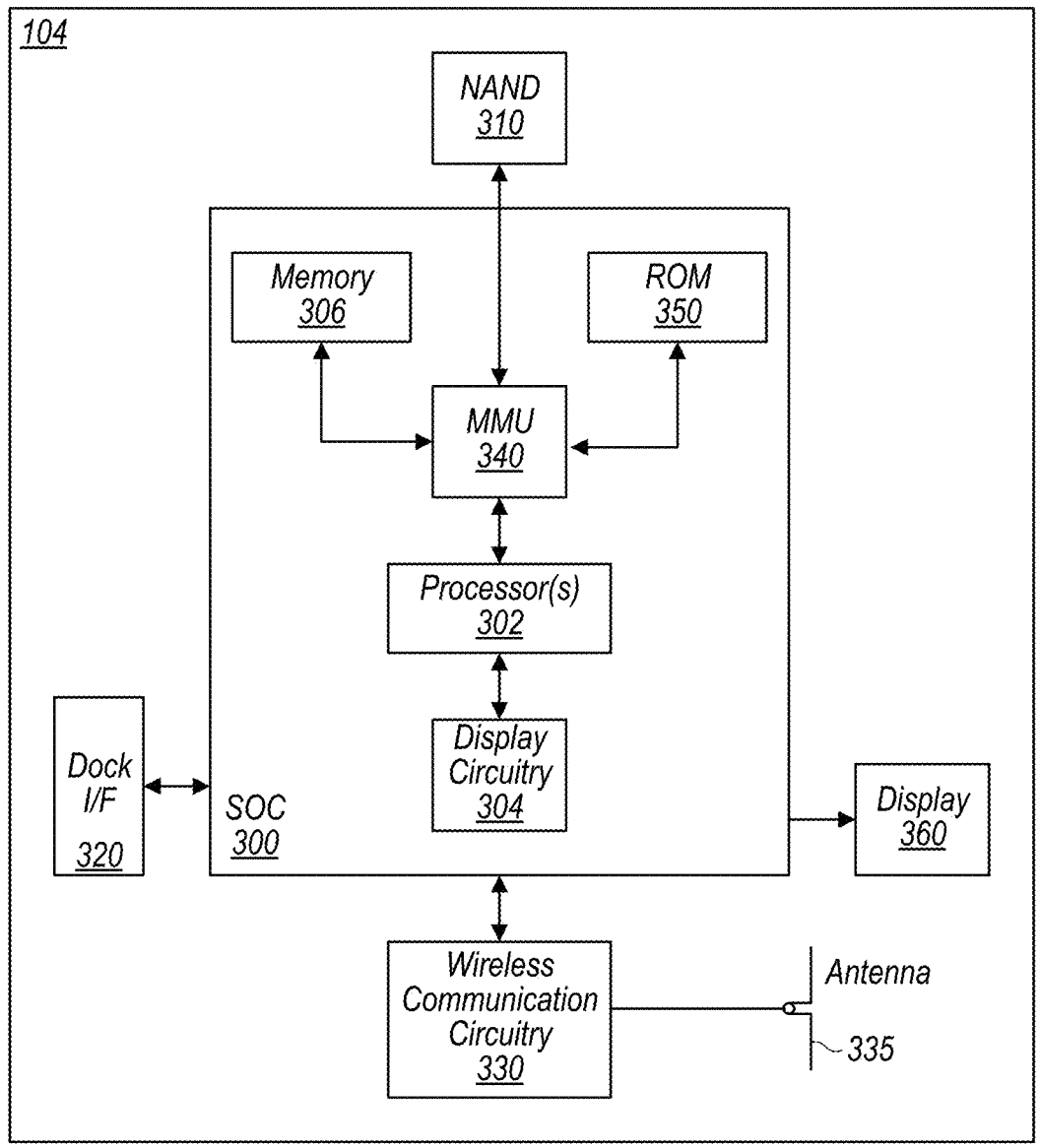
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing sidelink communication with flexible resource configuration for coverage enhancement in a wireless communication system, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
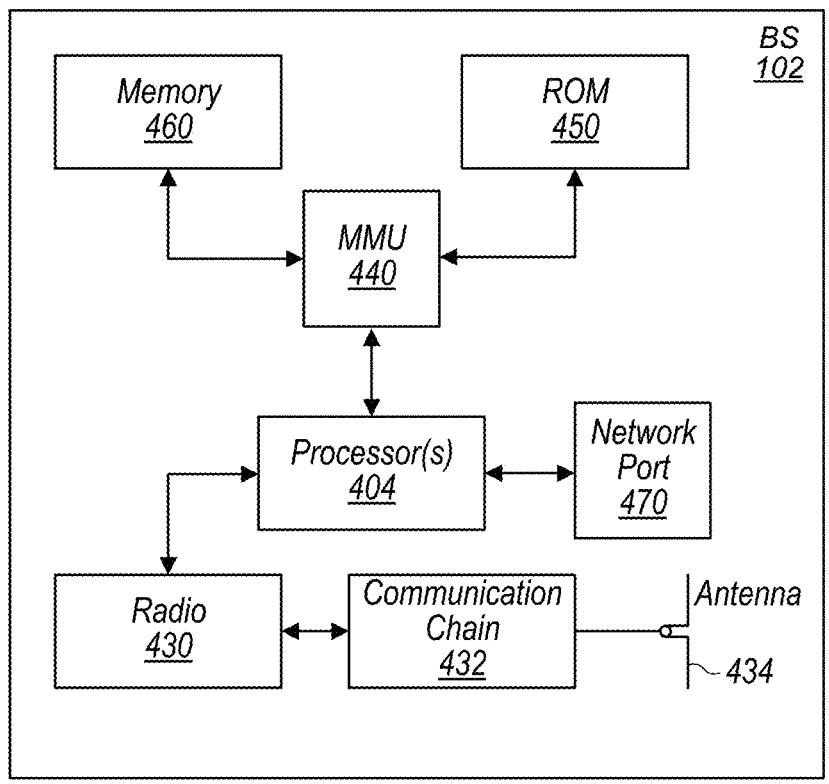
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
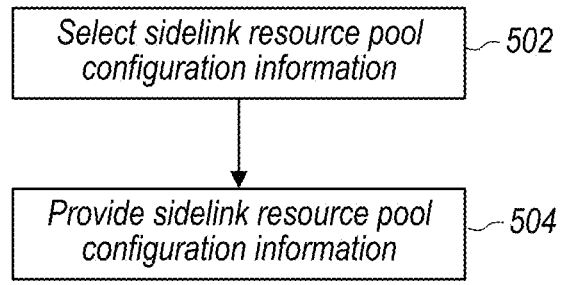
FIGS. 5-6 are flowchart diagrams illustrating aspects of exemplary techniques for performing sidelink communication with flexible resource configuration in a wireless communication system, according to some embodiments.

FIG. 5—Cellular Sidelink Communication

In wireless communications, specifically cellular wireless communications, sidelink communications represent a special kind of communication mechanism between devices that is not carried through a base station, e.g., through eNB/gNB. In other words, the devices communicate with each other without that communication going through a base station. In one sense, the devices may be said to be communicating with each other directly. Accommodation of such communication, however, requires a new physical layer design.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, such as vehicle platooning, extended sensors, advanced driving, and remote driving.

In LTE V2X, broadcast sidelink communications are supported, in which maintenance of the sidelink connection is performed using keep-alive messages communicated between upper layers (e.g., application layers, non-access stratum layers, etc.) of the wireless devices in communication. NR V2X supports unicast and groupcast sidelink communications, e.g., in addition to broadcast sidelink communications.

In order to support such V2X sidelink communications and/or other cellular sidelink communications, a variety of communication channels (e.g., control channels, data channels) may need to be provided. Accordingly, various possible techniques supporting cellular sidelink communication, including techniques for flexible resource configurations for coverage enhancement, are proposed herein. These may include techniques for flexible sidelink resource pool configuration, techniques for flexible sidelink resource unit configuration, techniques for flexible sidelink control channel resource configuration, and various other techniques.

Figure 6:
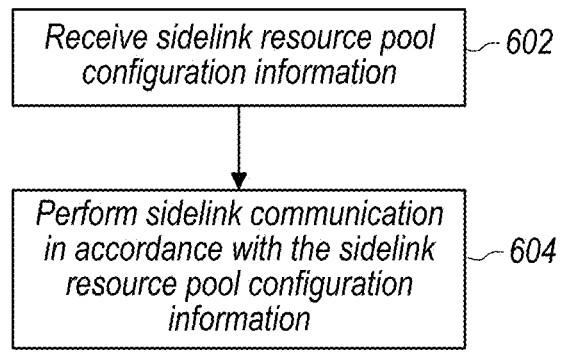

FIGS. 5-6 are flowchart diagrams illustrating example aspects of such techniques, at least according to some embodiments. Aspects of the methods of FIGS. 5-6 may be implemented by a cellular base station (such as a base station 102, RSU 110, etc.), a wireless device (such as a PUE 104, vehicle 106, etc.), any of various other possible wireless devices illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 5 may operate as follows.

In 502, a cellular base station may select a cellular sidelink resource pool. The cellular sidelink resource pool may include a set of time-frequency resources allocated for use for wireless devices to perform cellular sidelink transmission and/or reception, for example for 3GPP NR V2X sidelink communication, and/or for any of various other purposes. Selecting the cellular sidelink resource pool may include selecting a resource unit granularity for the cellular sidelink resource pool. For example, the cellular sidelink resource pool may be divided into a set of frequency sub-channels, each of which may include a certain number of physical resource blocks (PRBs), which the cellular base station may determine (e.g., from a set of supported sub-channel sizes) as part of the cellular sidelink resource pool selection. It may be the case that one frequency sub-channel for one time slot (e.g., as defined according to 3GPP NR, at least as one possibility) may be considered one resource unit (RU) of the cellular sidelink resource pool.

According to some embodiments, the cellular base station may also configure one or more "super resource units" (SRUs) for the cellular sidelink resource pool. Such SRUs may include multiple "regular" RUs; for example, each SRU may include multiple sub-channels in the frequency domain, and/or multiple time slots in the time domain. The sub-channels and/or time-slots of the SRU may be contiguous or non-contiguous.

At least in some instances, the time-frequency resources of the cellular sidelink resource pool selected by the cellular base station may include non-contiguous frequency resources. Providing support for such flexible allocation of resources to the cellular sidelink resource pool may enable more efficient spectrum usage, and/or may help support increased frequency diversity in cellular sidelink communications performed using the cellular sidelink resource pool. This may be particularly useful for scenarios in which wireless devices are in poor coverage, e.g., when coverage enhancement features may be desirable to increase the reliability of communications between those devices, among various other possible scenarios.

The cellular base station may also select a control channel configuration for the cellular sidelink resource pool. At least according to some embodiments, the cellular base station may be able to select a control channel configuration in a flexible manner, e.g., potentially including providing control channel resources that are non-contiguous in the frequency domain, that are allocated across multiple frequency sub-channels, and/or that are allocated across multiple time slots. Such flexible configuration possibilities may be used for control channel configuration in conjunction with SRUs (e.g., where control channel resources for each SRU non-contiguous in the frequency domain, allocated across multiple frequency sub-channels of the SRU, and/or allocated across multiple time slots of the SRU), or independently of any SRU configuration (e.g., even for RUs that are not aggregated into SRUs).

At least in some instances, if non-contiguous frequency resources are allocated for the cellular sidelink control channel, it may be the case that those resources are separated in frequency as much as possible for the set of frequency resources for which the cellular sidelink control channel is provided. For example, if non-contiguous frequency resources are allocated for the cellular sidelink control channel within a sub-channel, those frequency resources may include the lowest indexed PRB and the highest indexed PRB for that sub-channel. If non-contiguous frequency resources are allocated for the cellular sidelink control channel spanning multiple sub-channels, those frequency resources may include the lowest indexed PRB of the lowest indexed sub-channel and the highest indexed PRB of the highest indexed sub-channel. Such an approach may increase the frequency diversity of cellular sidelink control channel transmissions, at least according to some embodiments. Note that other configurations of non-contiguous frequency resources for the cellular sidelink control channel are also possible.

Note that if slot aggregation is used with respect to the cellular sidelink control channel configuration, it may be possible that one or more of an automatic gain control symbol and/or a gap and guard symbol may not be included between the aggregated slots, at least in some embodiments. It may be the case that the cellular sidelink control channel in each such RU is independently encoded, and that the cellular sidelink control channel is repeated in each RU of the slot aggregation. Additionally or alternatively, in some instances, a window may be defined for such cellular sidelink control channel repetitions, e.g., to reduce the wireless device hypothetical testing burden for the cellular sidelink control channel. For example, within a certain configured window of a certain number of slots, it may be the case that a configured maximum number of RUs or SRUs (which may be fewer than the number of slots in the window) is used for cellular sidelink control channel repetitions.

Additionally, note that it may be the case that wireless devices are expected to use cross slot scheduling (e.g., and not same slot scheduling) if the sidelink control channel resources are configured to have a time duration (e.g., number of symbols or slots) above a certain threshold, at least in some embodiments. For example, it may be the case that a wireless device receiving a cellular sidelink control channel transmission that is limited to use for cross slot scheduling may expect that a time offset of sufficient duration as to support decoding of the control information will occur between the control information and a data communication scheduled by the control information. As a result, it may be the case that such a wireless device need not buffer the data channel resources in the same time slot(s) as the cellular sidelink control channel transmission. Accordingly, such a limitation may be introduced to reduce buffering requirements for wireless devices receiving such cellular sidelink control channel transmissions, at least in some instances.

In 504, the cellular base station may provide cellular sidelink configuration information to a wireless device. The cellular sidelink configuration information may include cellular sidelink resource pool configuration information and/or cellular sidelink control channel configuration information, among various possible configuration information. The cellular sidelink configuration information may be provided in any of various ways, including (but not limited to) in broadcast system information (e.g., system information blocks or SIBs), in dedicated radio resource control (RRC) signaling, using media access control (MAC) control elements (CEs), and/or using a combination of any or all of these.

At least according to some embodiments, the cellular sidelink resource pool configuration information may include an indication of the selected cellular sidelink resource pool (e.g., which may include non-contiguous frequency resources). In some instances, the cellular sidelink resource pool frequency resources may be indicated using one or more bitmaps, e.g., to indicate which frequency sub-channels of a set of multiple frequency sub-channels are included in the cellular sidelink resource pool. As one such possibility, each bit of a bitmap may be used to indicate whether a corresponding frequency sub-channel is included in the cellular sidelink resource pool. As another possibility, each bit of a bitmap may be used to indicate whether a corresponding segment of multiple frequency sub-channels is included in the cellular sidelink resource pool. As a still further possibility, multiple bitmaps may be used, where each bit of a first bitmap may be used to indicate whether at least one sub-channel of a corresponding segment of multiple frequency sub-channels is included in the cellular sidelink resource pool, and the second bitmap configures which frequency resources are included in the cellular sidelink resource pool per-segment.

In some instances, the cellular sidelink resource pool configuration information may also include information indicating an SRU configuration, e.g., if applicable. Such information may indicate, for example, the size of each SRU, whether the sub-channels of each SRU are contiguous, and/or how any leftover sub-channels that do not fit into the SRU configuration are used. If the sub-channels of an SRU are non-contiguous, a bitmap based approach may be used to indicate which sub-channels are configured for the SRU. For example, each bit of a bitmap may be used to indicate whether a corresponding frequency sub-channel is included in the SRU, or each bit of a bitmap may be used to indicate whether a corresponding segment of multiple frequency sub-channels is included in the SRU. As another example, multiple bitmaps may be used, where each bit of a first bitmap may be used to indicate whether at least one sub-channel of a corresponding segment of multiple frequency sub-channels is included in the SRU, and the second bitmap configures which frequency resources are included in the SRU per-segment. A similar approach may be used to indicate which slots are configured for an SRU. For example, each bit of a bitmap may be used to indicate whether a corresponding time slot is included in the SRU, or each bit of a bitmap may be used to indicate whether a corresponding segment of multiple time slots is included in the SRU. As another example, multiple bitmaps may be used, where each bit of a first bitmap may be used to indicate whether at least one time slot of a corresponding segment of multiple time slots is included in the SRU, and the second bitmap configures which slots are included in the SRU per-segment.

In some instances, the cellular sidelink control channel configuration information may include information indicating the control channel configuration selected by the cellular base station. For example, the cellular sidelink control channel configuration information may include information indicating if cellular sidelink control channel resources are non-contiguous in the frequency domain, allocated across multiple frequency sub-channels, and/or allocated across multiple time slots, and/or any of various other possible types of cellular sidelink control channel configuration information.

As shown, the method of FIG. 6 may operate as follows.

In 602, a wireless device may receive cellular sidelink configuration information. The cellular sidelink configuration information may include cellular sidelink resource pool configuration information and/or cellular sidelink control channel configuration information, among various possible configuration information. The cellular sidelink configuration information may be received from a cellular base station. For example, the cellular base station may have selected and provided cellular sidelink configuration parameters in a manner in accordance with the method of FIG. 5, or in any of various other possible manners. The cellular sidelink configuration information may be received in any of various ways, including (but not limited to) in broadcast system information (e.g., system information blocks or SIBs), in dedicated radio resource control (RRC) signaling, using media access control (MAC) control elements (CEs), and/or using a combination of any or all of these.

As another possibility, some or all of the cellular sidelink configuration information may be pre-configured, e.g., in a subscriber identity module (SIM) of the wireless device, by an original equipment manufacturer (OEM) of the wireless device, or by a chipset vendor of a chipset used by the wireless device, among various possibilities. For example, the OEM or chipset vendor could provide a resource configuration for use in license-exempt spectrum. This may allow the wireless device to perform cellular sidelink communication with similarly configured devices (e.g., in the configured license-free spectrum) when outside of the coverage range of a cellular network, at least according to some embodiments.

At least according to some embodiments, the cellular sidelink resource pool configuration information may include an indication of a cellular sidelink resource pool, which may include non-contiguous frequency resources. In some instances, the cellular sidelink resource pool frequency resources may be indicated using one or more bitmaps, e.g., to indicate which frequency sub-channels of a set of multiple frequency sub-channels are included in the cellular sidelink resource pool. As one such possibility, each bit of a bitmap may be used to indicate whether a corresponding frequency sub-channel is included in the cellular sidelink resource pool. As another possibility, each bit of a bitmap may be used to indicate whether a corresponding segment of multiple frequency sub-channels is included in the cellular sidelink resource pool. As a still further possibility, multiple bitmaps may be used, where each bit of a first bitmap may be used to indicate whether at least one sub-channel of a corresponding segment of multiple frequency sub-channels is included in the cellular sidelink resource pool, and the second bitmap configures which frequency resources are included in the cellular sidelink resource pool per-segment.

In some instances, the cellular sidelink resource pool configuration information may also include information indicating an SRU configuration, e.g., if applicable. Such information may indicate, for example, the size of each SRU, whether the sub-channels of each SRU are contiguous, and/or how any leftover sub-channels that do not fit into the SRU configuration are used. If the sub-channels of an SRU are non-contiguous, a bitmap based approach may be used to indicate which sub-channels are configured for the SRU. For example, each bit of a bitmap may be used to indicate whether a corresponding frequency sub-channel is included in the SRU, or each bit of a bitmap may be used to indicate whether a corresponding segment of multiple frequency sub-channels is included in the SRU. As another example, multiple bitmaps may be used, where each bit of a first bitmap may be used to indicate whether at least one sub-channel of a corresponding segment of multiple frequency sub-channels is included in the SRU, and the second bitmap configures which frequency resources are included in the SRU per-segment. A similar approach may be used to indicate which slots are configured for an SRU. For example, each bit of a bitmap may be used to indicate whether a corresponding time slot is included in the SRU, or each bit of a bitmap may be used to indicate whether a corresponding segment of multiple time slots is included in the SRU. As another example, multiple bitmaps may be used, where each bit of a first bitmap may be used to indicate whether at least one time slot of a corresponding segment of multiple time slots is included in the SRU, and the second bitmap configures which slots are included in the SRU per-segment.

In some instances, the cellular sidelink control channel configuration information may include information indicating the control channel configuration selected by the cellular base station. For example, the cellular sidelink control channel configuration information may include information indicating if cellular sidelink control channel resources are non-contiguous in the frequency domain, allocated across multiple frequency sub-channels, and/or allocated across multiple time slots, and/or any of various other possible types of cellular sidelink control channel configuration information.

In 604, the wireless device may perform sidelink communication with another wireless device in accordance with the cellular sidelink configuration information. This may include transmitting and/or receiving signals using resources included in the allocated cellular sidelink resource pool. This may also include transmitting and/or receiving (e.g., using blind decoding) cellular sidelink control channel transmissions that include resources that are non-contiguous in the frequency domain, that are allocated across multiple frequency sub-channels, and/or that are allocated across multiple time slots.

As previously noted, at least in some instances, if non-contiguous frequency resources are allocated for the cellular sidelink control channel, it may be the case that those resources are separated in frequency as much as possible for the set of frequency resources for which the cellular sidelink control channel is provided. For example, if non-contiguous frequency resources are allocated for the cellular sidelink control channel within a sub-channel, those frequency resources may include the lowest indexed PRB and the highest indexed PRB for that sub-channel. Similarly, if non-contiguous frequency resources are allocated for the cellular sidelink control channel spanning multiple sub-channels, those frequency resources may include the lowest indexed PRB of the lowest indexed sub-channel and the highest indexed PRB of the highest indexed sub-channel, at least in some instances.

As similarly noted with respect to the method of FIG. 5, if slot aggregation is used with respect to the cellular sidelink control channel configuration, it may be possible that one or more of an automatic gain control symbol and/or a gap and guard symbol may not be included between the aggregated slots, at least in some embodiments. It may be the case that the cellular sidelink control channel in each such RU is independently encoded, and that the cellular sidelink control channel is repeated in each RU of the slot aggregation. Additionally or alternatively, in some instances, a window may be defined for such cellular sidelink control channel repetitions, e.g., to reduce the wireless device hypothetical testing burden for the cellular sidelink control channel. For example, within a certain configured window of a certain number of slots, it may be the case that a configured maximum number of RUs or SRUs (which may be fewer than the number of slots in the window) is used for cellular sidelink control channel repetitions.

Additionally, it may be the case that the wireless device uses cross slot scheduling (e.g., and not same slot scheduling) if the sidelink control channel resources are configured to have a time duration (e.g., number of symbols or slots) above a certain threshold, at least in some embodiments. For example, it may be the case that a wireless device receiving a cellular sidelink control channel transmission that is limited to use for cross slot scheduling may expect that a time offset of sufficient duration as to support decoding of the control information will occur between the control information and a data communication scheduled by the control information. As a result, it may be the case that such a wireless device need not buffer the data channel resources in the same time slot(s) as the cellular sidelink control channel transmission. Accordingly, as previously noted herein, such a limitation may be introduced to reduce buffering requirements for wireless devices receiving such cellular sidelink control channel transmissions, at least in some instances.

Thus, the methods of FIGS. 5-6 may be used (e.g., independently or in conjunction with each other) to support flexible cellular sidelink resource pool, resource unit, and/or control channel resource configuration. These techniques may be useful in poor coverage scenarios, e.g., as they may provide the possibility of increased frequency diversity and/or lower coding rates by allowing the use of non-contiguous frequency resources and/or aggregation of multiple resource units into larger super resource units, among various other possible scenarios, at least according to some embodiments.

FIGS. 7-16 and Additional Information

FIGS. 7-16 illustrate further aspects that might be used in conjunction with the methods of FIGS. 5-6 if desired. It should be noted, however, that the exemplary details illustrated in and described with respect to FIGS. 7-16 are not intended to be limiting to the disclosure as a whole: numerous variations and alternatives to the details provided herein below are possible and should be considered within the scope of the disclosure.

Figure 7:
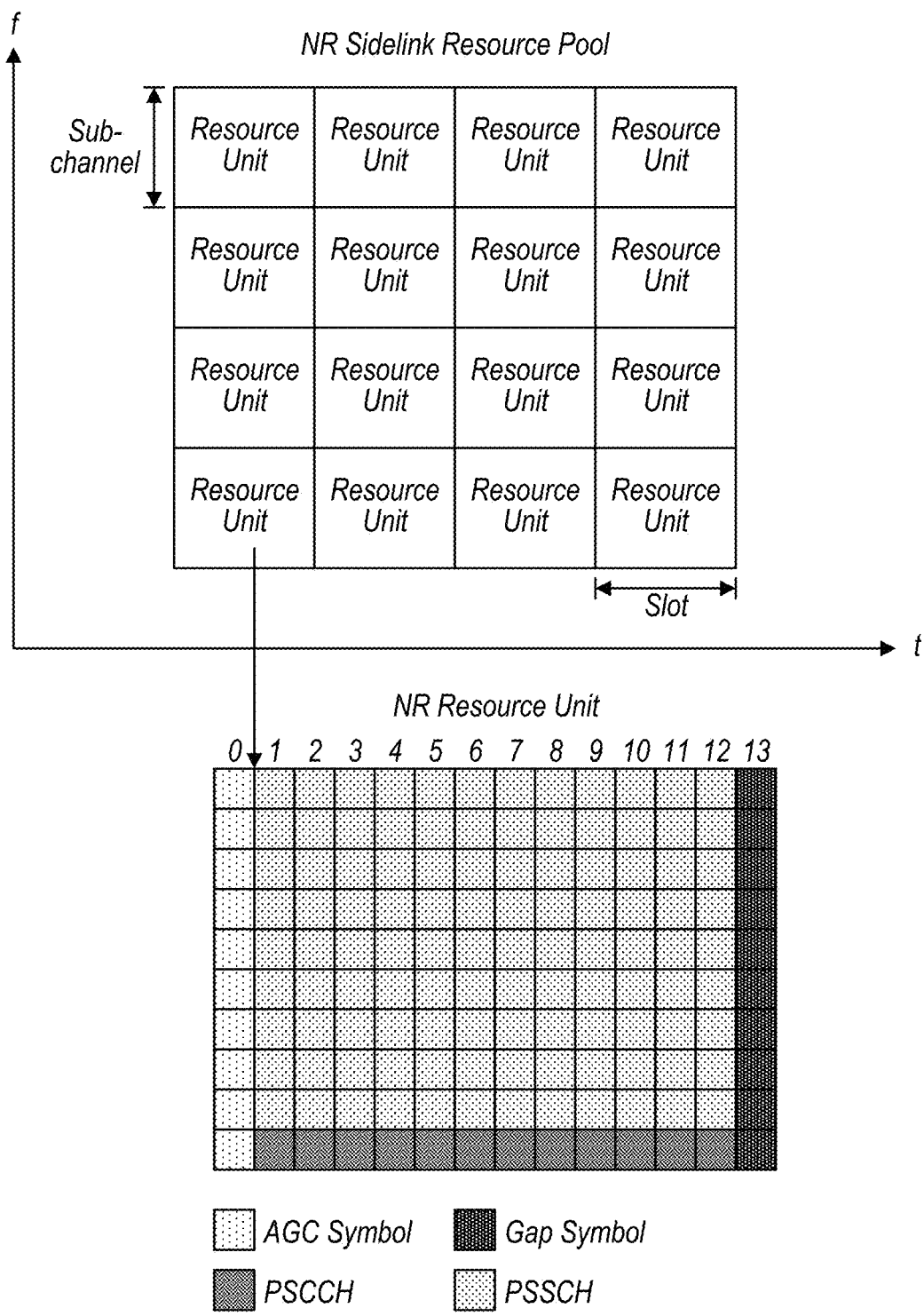
FIG. 7 illustrates aspects of an exemplary possible resource pool configuration for cellular sidelink communication, according to some embodiments.

In order to support 3GPP NR V2X sidelink communication, it may be the case that a resource pool for such communication can be configured, e.g., by a cellular base station, or using a pre-configuration mechanism (e.g., allocated by a carrier with subscription information included in a subscriber identity module) for use when out of the coverage range of a cellular base station, among various possibilities. The V2X sidelink resource pool may include a set of time-frequency resources allocated (exclusively or non-exclusively) for sidelink transmission and/or reception. FIG. 7 illustrates aspects of one such possible resource pool configuration, e.g., including possible time and frequency unit denominations and uses, according to some embodiments. As shown, in the illustrated example, the frequency domain may be divided into sub-channels, each of which may include a continuous set of physical resource blocks (PRBs), with any of a variety of sub-channel sizes (e.g., {10, 15, 20, 25, 50, 75, 100} PRBs, as one possibility) supported. It may be the case that a single sub-channel size value is (pre-)configured for a resource pool, and that all sub-channels in the resource pool have that same number of PRBs. In the time domain, the granularity of resource units may be the 3GPP NR slot. It may be the case that non-contiguous time resources can be configured in a resource pool; for example such non-contiguous time resources could be (pre-)configured with a bitmap.

In the illustrated example, a set of time-frequency resources spanning one sub-channel and one slot may be referred to as a resource unit (RU). Each RU may include further sub-denominations of time-frequency resources (e.g., each symbol and PRB), which may carry various communication channels and/or serve various other purposes for the sidelink communication. For example, in the scenario of FIG. 7, the first symbol in the time domain may be used to support automatic gain control, and the last symbol in the time domain may be used as a gap symbol, for example, to support switching the communication configuration of a wireless device in case the wireless device uses half-duplex communication. Further, for symbols 1 through 12, the lowest frequency PRB may be used to carry the physical sidelink control channel (PSCCH), while the remaining PRBs may be used to carry the physical sidelink shared channel (PSSCH). Note that the configuration illustrated in FIG. 7 is provided by way of example, but is not intended to be limiting; numerous other resource pool and/or resource unit configurations are also possible, including the various alternative configurations described herein.

Figure 8:
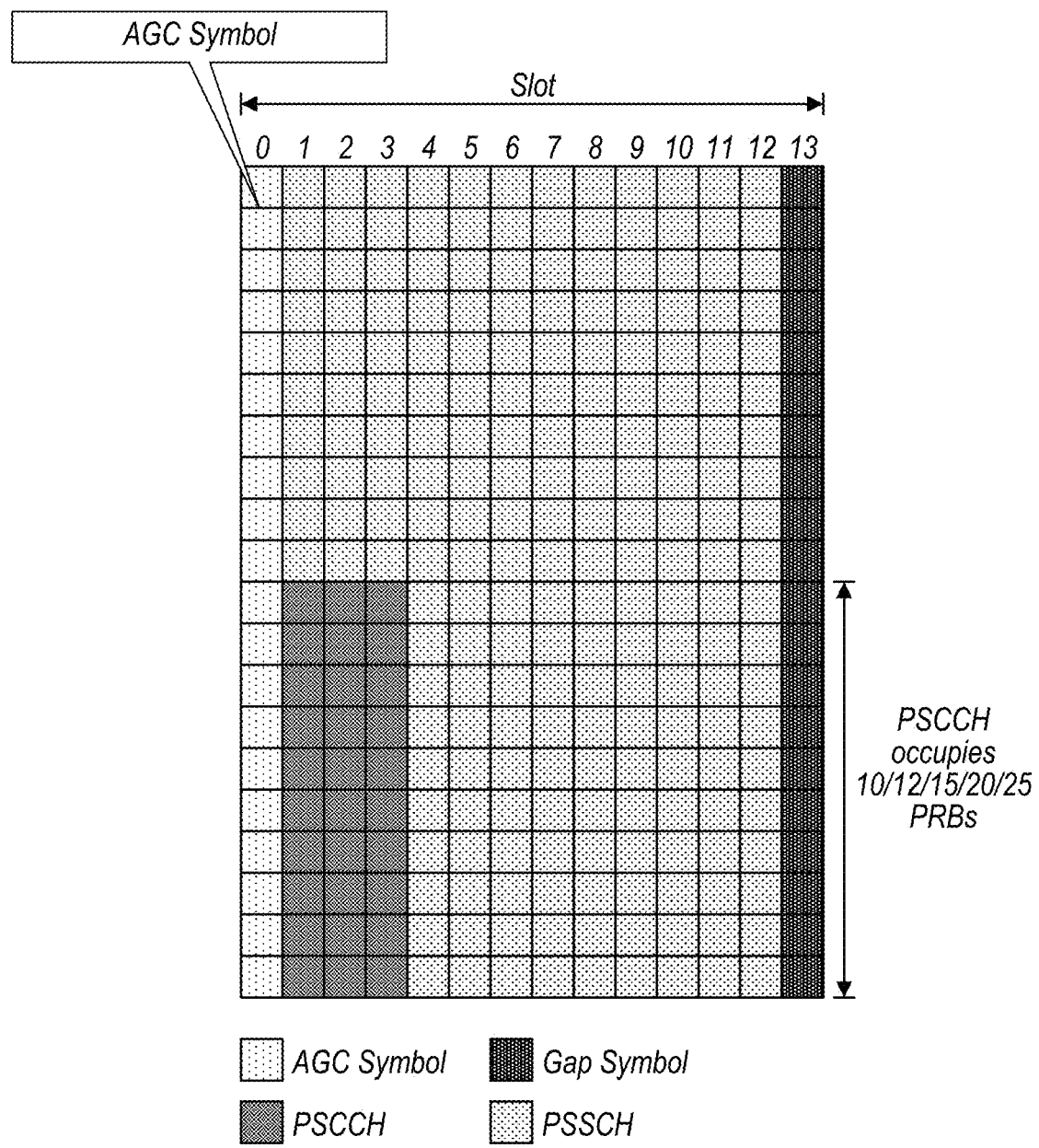
FIG. 8 illustrates aspects of an exemplary possible sidelink control channel design cellular sidelink communication, according to some embodiments.
Figure 12:
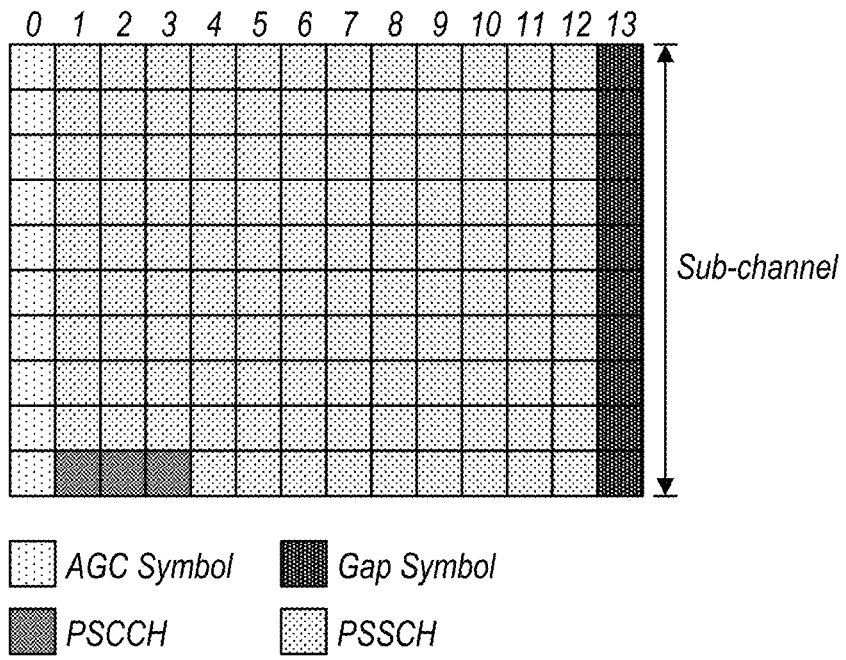
FIGS. 12-16 illustrate aspects of various possible sidelink control channel resource configurations, according to some embodiments.
Figure 13:
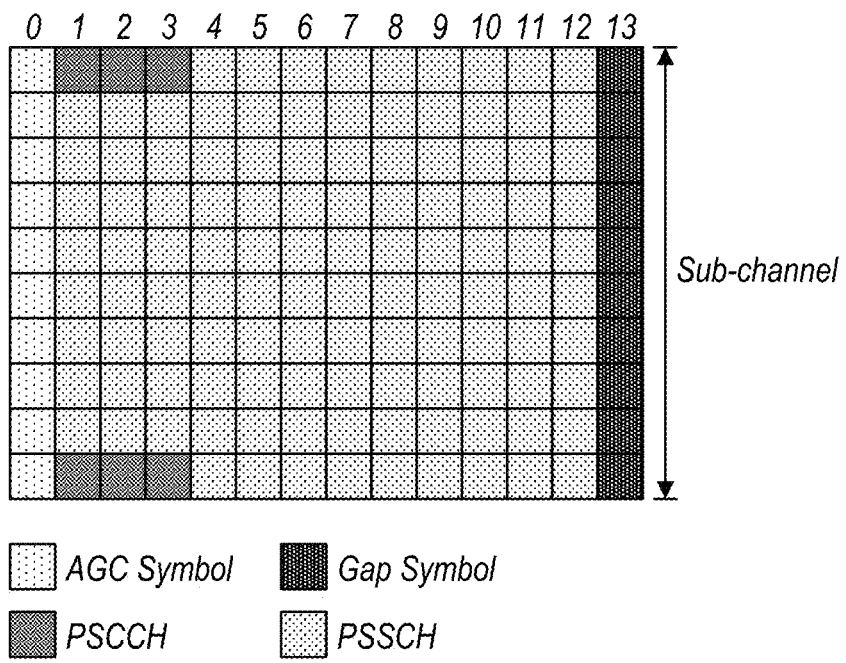
Figure 14:
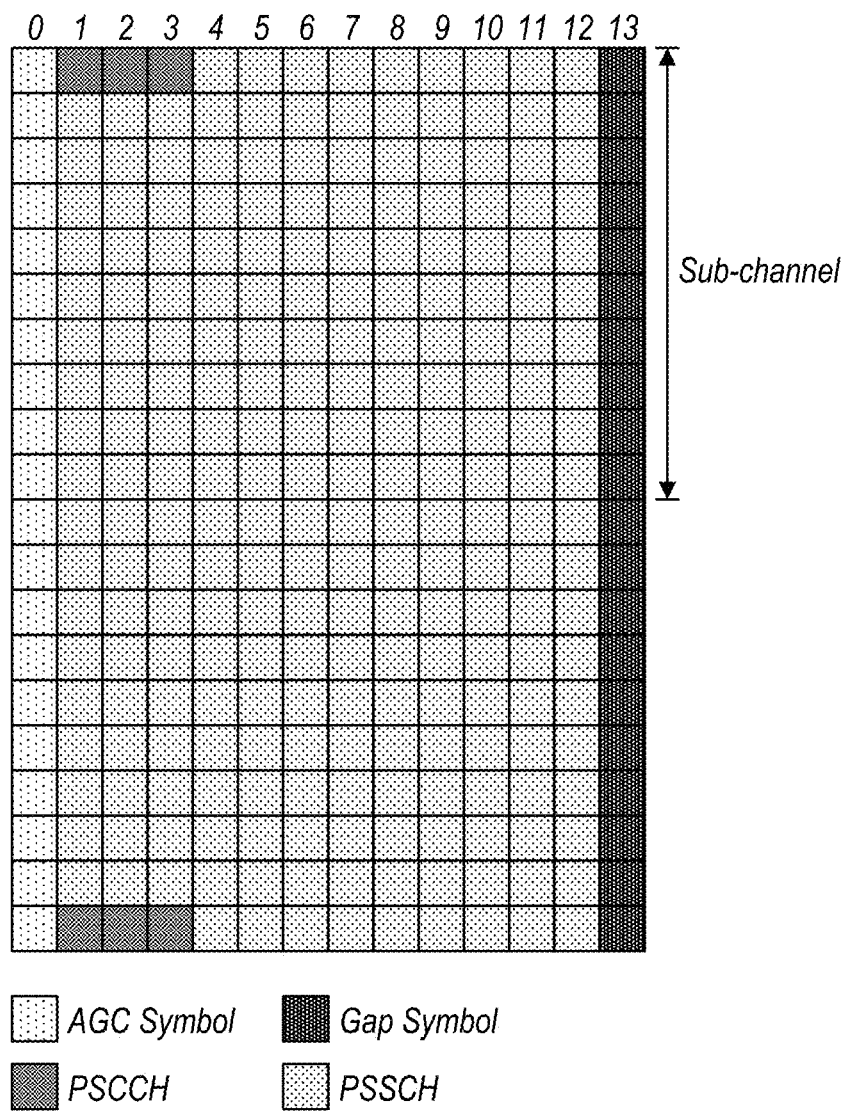
Figure 15:
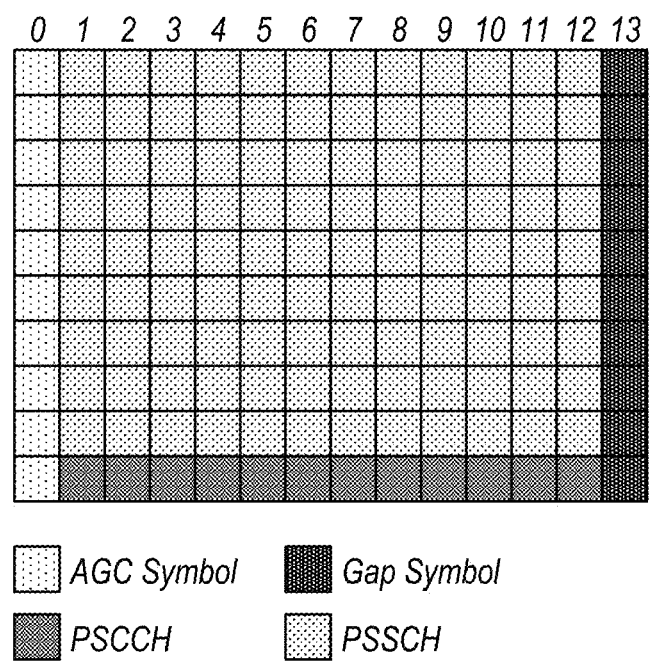
Figure 16:
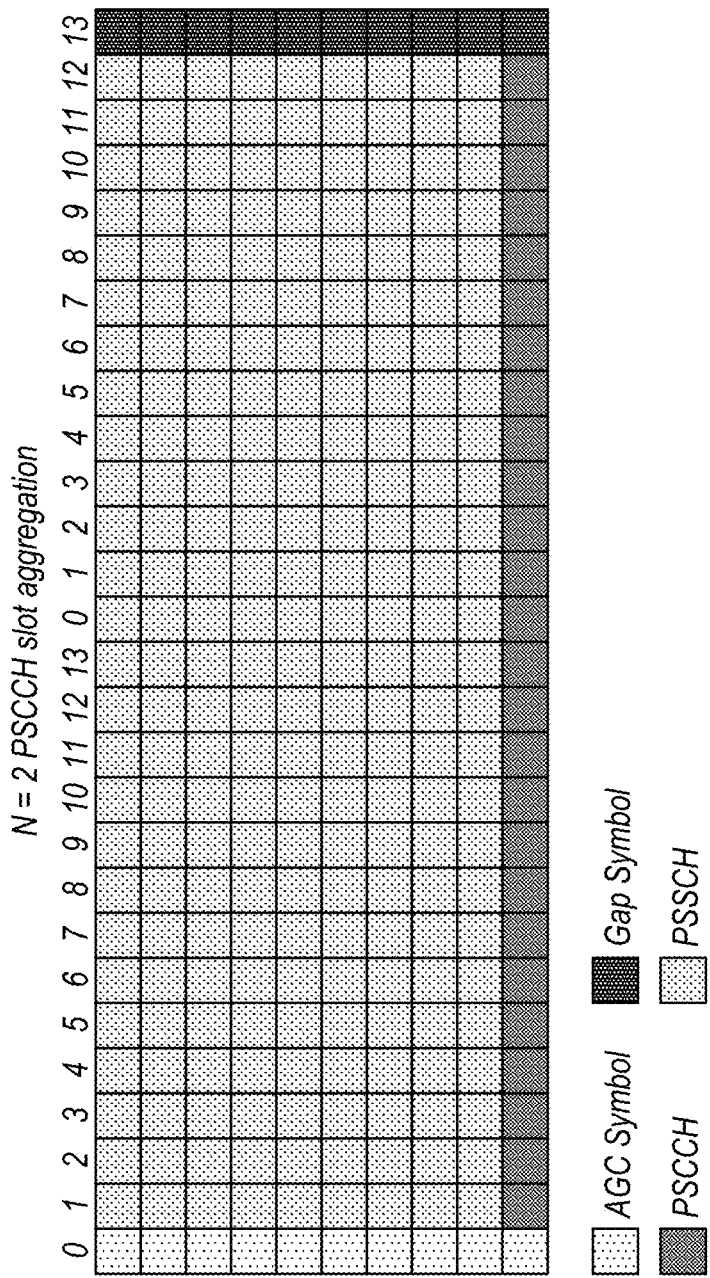

FIG. 8 further illustrates possible aspects of an example PSCCH design within a V2X sidelink resource unit, according to some embodiments. As shown, in the illustrated example, the PSCCH may start from the second symbol in a slot in the time domain, and may last for 2 or 3 symbols, e.g., by (pre-)configuration. In the frequency domain, the PSCCH may occupy several contiguous PRBs, with potential candidate numbers of PRBS of {10, 12, 15, 20, 25} contiguous PRBs within a sub-channel, where the lowest PRB of the PSCCH is the same as the lowest PRB of the corresponding PSSCH.

At least according to some embodiments, the PSCCH may contain sidelink control information (SCI) stage 1, which may include information indicating priority (e.g., 3 bits), PSSCH frequency and time resource assignment, a resource reservation period (e.g., 0-4 bits), demodulation reference symbol (DMRS) pattern (if more than 1 pattern is configured), SCI stage 2 format, beta offset indicator, number of DMRS ports (e.g., 1 bit), modulation and coding scheme (MCS) table (e.g., 0-2 bits) and MCS (e.g., 5 bits), and possibly one or more reserved resources, at least as one possibility. In other embodiments, any number of additional and/or alternative types and/or amounts of information may be included in the PSCCH.

At least in some embodiments, it may be beneficial to expand the set of possible resource pool, resource unit, and/or PSCCH design configurations beyond the examples of FIGS. 7-8. For example, when operating in poor coverage scenarios, it may be beneficial to provide the possibility of more flexible resource pool, resource unit, and/or PSCCH design configurations, which may potentially support greater transmit/receive diversity benefits, and/or support lower coding rates that can potentially increase the reliability and/or robustness of the sidelink communications.

As one such possibility, it may be possible to support flexible NR sidelink resource pool configuration in such a manner that the resource pool can be configured in the frequency domain in a non-contiguous way. FIGS. 9-11 illustrate aspects of various such possible approaches to resource pool configuration.

In each of the illustrated scenarios, one or more bitmaps may be used to configure the (potentially non-contiguous) frequency domain resource allocation. In the scenario illustrated in FIG. 9, the basic unit in the frequency domain may be the sub-channel, and the bitmap may be configured such that for N sub-channels, a N bit bitmap is used to configure frequency domain resources for the resource pool. Thus, in the illustrated scenario, a bitmap of {1, 0, 0 1} may be used to indicate that sub-channels 0 and 3 are part of the resource pool and sub-channels 1 and 2 are not.

In the scenario illustrated in FIG. 10, the basic unit in the frequency domain may be the sub-channel, and the bitmap may be configured such that for N sub-channels, M segments are defined with each segment containing K contiguous sub-channels (e.g., such that N=M*K). A M bit bitmap may be used to configure frequency domain resources for the resource pool, where for each bit that is 1, the corresponding K contiguous sub-channels are configured. Thus, in the illustrated scenario, M=K=2, and a bitmap of {1, 0} may be used to indicate that sub-channels 0 and 1 are part of the resource pool and sub-channels 2 and 3 are not. This approach may incur less signaling overhead than the approach of FIG. 9, at least in some instances, at a potential cost of reduced flexibility to configure the resource pool.

In the scenario illustrated in FIG. 11, the basic unit in the frequency domain may be the sub-channel, and the bitmap may be configured such that for N sub-channels, M segments are defined with each segment containing K contiguous sub-channels (e.g., such that N=M*K). A M bit bitmap may be used to configure frequency domain resources for the resource pool, as well as a separate K bit bitmap that is used to configure per-segment frequency domain resources, such that a sub-channel is configured if and only if the corresponding bit in both bitmaps is equal to 1. Thus, in the illustrated scenario, M=K=2, and a M bit bitmap of {1, 1} and a K bit bitmap of {1, 0} may be used to indicate that sub-channels 0 and 2 are part of the resource pool and sub-channels 1 and 3 are not. In at least some respects, this approach may represent an intermediate approach relative to the scenarios of FIGS. 9-10, e.g., with potentially less signaling overhead but also less flexibility to configure the resource pool than the approach of FIG. 9, and more signaling overhead but also more flexibility to configure the resource pool than the approach of FIG. 10.

As previously noted herein, it may also be possible to support flexible resource unit configuration for NR sidelink communication. For example, in addition to defining basic "resource units" composed of a one sub-channel and one slot block of time-frequency resources, it may be possible for a larger unit of resources, (e.g., a "super resource unit" or SRU) to be configured for a NR sidelink resource pool. At least in some instances, such an SRU could contain multiple sub-channels in the frequency domain (which could be contiguous or non-contiguous) and/or multiple slots in the time domain (which could be contiguous or non-contiguous).

For example, it could be the case that a cellular base station could configure (e.g., using RRC signaling) a contiguous set of N (where N>1) sub-channels for each SRU. In case there is a number of leftover sub-channels M at the edge of the spectrum configured for the NR sidelink communication, where M<N, it could be the case that no SRU is defined for the leftover sub-channels, or that a SRU is defined for those M sub-channels, or that "regular" RU are used for the leftover sub-channels, e.g., such that each sub-channel corresponds to one SRU for those M sub-channels. As another example, it could be the case that a cellular base station could configure a non-contiguous set of sub-channels for each SRU, e.g., using the techniques of any of FIGS. 9-11 to configure the frequency sub-channels included in each SRU.

Similar approaches may be used to configure an SRU or set of SRUs in the time domain. For example, SRUs may be configured with multiple slots that are contiguous in the time domain, with N (where N>1) consecutive slots for each SRU. As another example, the slots can be non-contiguous, and may be scheduled using a "long" bitmap, which may include a N bit bitmap, where each bit indicates whether a slot is included in the SRU; a "short" bitmap, which may include a M bit bitmap, where each bit indicates whether a segment of K consecutive slots is included in the SRU (e.g., such that N=M*K); or an alternative "short" bitmap, which may include a M bit bitmap, where each bit corresponds to a segment of K consecutive slots (e.g., such that N=M*K), and a further K bit bitmap is used to configure the slots in a segment.

As also previously noted herein, it may be possible to support flexible PSCCH resource configuration for NR sidelink communication. Such flexible PSCCH resource configurations may include allowing both contiguous and non-contiguous PRB allocations, and/or allowing both within sub-channel and cross sub-channel PRB allocations.

FIGS. 12-16 illustrate various such possible PSCCH configurations that may differ from the example configuration illustrated in FIG. 8. In the illustrated example of FIG. 12, a narrower PSCCH resource allocation (e.g., {1, 2, 4, 6, 8} contiguous PRBs) may be used. In the illustrated example of FIG. 13, a non-contiguous PSCCH resource allocation within a sub-channel may be used. In the illustrated example of FIG. 14, a non-contiguous PSCCH resource allocation across sub-channels may be used. In each of these examples, as shown, the PSCCH resource allocation may remain within the first 2-3 symbols (e.g., after an AGC symbol) of a slot. In the illustrated example of FIG. 15, in contrast, a longer duration PSCCH resource allocation (e.g., {4, 5, 6, 7, 8, 9, 10, 11, 12} symbols within a slot) may be used to provide a more flexible resource allocation in the time domain. In the illustrated example of FIG. 16, a still longer duration PSCCH resource allocation, including PSCCH slot aggregation where a single PSCCH can span more than 1 contiguous slot, may be used to provide a more flexible resource allocation in the time domain. In such a scenario, it may be the case that the number of slots aggregated can be configured by RRC or changed by media access control (MAC) control element (CE). The starting slot may be the first slot in system frame number (SFN)=0, as one possibility. Within the slot aggregation, it may be the case that no gap and guard symbol is needed.

As a still further possibility, PSCCH slot aggregation may be possible where a single PSCCH instance can span more than 1 non-contiguous slots. In such a scenario, it may be the case that gap and guard symbol is needed for each resource unit. The PSCCH in each resource unit may be independently encoded. It may be the case that the PSCCH is repeated in each resource unit. A window may be defined for PSCCH repetition, e.g., to reduce the amount of UE hypothetical testing needed to perform blind decoding, at least in some instances. For example, within a window of L contiguous slots, it may be configured that at most N (where N≤L) RU or SRU are used for PSCCH repetition.

In some instances, when such PSCCH slot aggregation is configured, it may be the case that the UE can expect to have cross slot scheduling, e.g., such that the timing offset between a scheduling PSCCH communication and a PSSCH communication scheduled by the PSCCH communication is large enough that the UE is able to decode the PSCCH before the PSSCH starts. Such a limitation may be enabled under certain conditions, such as when the number of slots in a slot aggregation configuration is larger than a certain threshold, and/or when non-contiguous slot aggregation is configured and the window length is greater than a certain threshold, among various possibilities.

In the following further exemplary embodiments are provided.

One set of embodiments may include an apparatus, comprising: a processor configured to cause a cellular base station to: select a cellular sidelink resource pool, wherein the cellular sidelink resource pool includes non-contiguous frequency resources; and provide cellular sidelink resource pool configuration information to a wireless device, wherein the cellular sidelink resource pool configuration information configures the cellular sidelink resource pool that includes non-contiguous frequency resources.

According to some embodiments, the cellular sidelink resource pool configuration information includes a bitmap, wherein each bit of the bitmap indicates whether a corresponding frequency sub-channel is included in the cellular sidelink resource pool.

According to some embodiments, the cellular sidelink resource pool configuration information includes a bitmap, wherein each bit of the bitmap indicates whether a corresponding segment of multiple frequency sub-channels is included in the cellular sidelink resource pool.

According to some embodiments, the cellular sidelink resource pool configuration information further includes a second bitmap, wherein the second bitmap configures which frequency resources are included in the cellular sidelink resource pool per segment.

According to some embodiments, the processor is further configured to cause the cellular base station to: select a resource unit configuration for the cellular sidelink resource pool, wherein selecting the resource unit configuration includes selecting a number of physical resource blocks (PRBs) that are included in each frequency sub-channel of the cellular sidelink resource pool, wherein selecting the resource unit configuration further includes selecting a number of frequency sub-channels and a number of time slots that are included in each super resource unit (SRU) of the cellular sidelink resource pool, wherein the cellular sidelink resource pool configuration information includes information indicating the selected resource unit configuration for the cellular sidelink resource pool.

According to some embodiments, one or more of the frequency sub-channels or the time slots that are included in at least one SRU of the cellular sidelink resource pool are contiguous.

According to some embodiments, one or more of the frequency sub-channels or the time slots that are included in at least one SRU of the cellular sidelink resource pool are non-contiguous.

According to some embodiments, the processor is further configured to cause the cellular base station to: select a control channel configuration for the cellular sidelink resource pool, wherein the cellular sidelink resource pool configuration information includes information indicating the selected control channel configuration for the cellular sidelink resource pool, wherein according to the control channel configuration for the cellular sidelink resource pool, control channel resources are one or more of: non-contiguous in the frequency domain; allocated across multiple frequency sub-channels; or allocated across multiple time slots.

Another set of embodiments may include a cellular base station, comprising: at least one antenna for performing wireless communications; a radio coupled to the at least one antenna; and a processor coupled to the radio; wherein the cellular base station is configured to: select a cellular sidelink resource pool, wherein the cellular sidelink resource pool includes non-contiguous frequency resources; and provide cellular sidelink resource pool configuration information to a wireless device, wherein the cellular sidelink resource pool configuration information configures the cellular sidelink resource pool that includes non-contiguous frequency resources.

According to some embodiments, the cellular sidelink resource pool configuration information includes one or more bitmaps configured to indicate which frequency sub-channels of a plurality of frequency sub-channels are included in the cellular sidelink resource pool.

According to some embodiments, the cellular base station is further configured to: select a control channel configuration for the cellular sidelink resource pool, wherein the cellular sidelink resource pool configuration information includes information indicating the selected control channel configuration for the cellular sidelink resource pool.

According to some embodiments, according to the control channel configuration for the cellular sidelink resource pool, control channel resources are non-contiguous in the frequency domain.

According to some embodiments, according to the control channel configuration for the cellular sidelink resource pool, control channel resources are allocated across multiple frequency sub-channels.

According to some embodiments, according to the control channel configuration for the cellular sidelink resource pool, control channel resources are allocated across multiple time slots.

Yet another set of embodiments may include a method, comprising: by a cellular base station: selecting a cellular sidelink resource pool, wherein the cellular sidelink resource pool includes non-contiguous frequency resources; and providing cellular sidelink resource pool configuration information to a wireless device, wherein the cellular sidelink resource pool configuration information configures the cellular sidelink resource pool that includes non-contiguous frequency resources.

According to some embodiments, the cellular sidelink resource pool configuration information includes one or more bitmaps configured to indicate which frequency sub-channels of a plurality of frequency sub-channels are included in the cellular sidelink resource pool.

According to some embodiments, the method further comprises: selecting a resource unit configuration for the cellular sidelink resource pool, wherein selecting the resource unit configuration includes selecting a number of physical resource blocks (PRBs) that are included in each frequency sub-channel of the cellular sidelink resource pool, wherein selecting the resource unit configuration further includes selecting a number of frequency sub-channels and a number of time slots that are included in each super resource unit (SRU) of the cellular sidelink resource pool, wherein the cellular sidelink resource pool configuration information includes information indicating the selected resource unit configuration for the cellular sidelink resource pool.

According to some embodiments, one or more of the frequency sub-channels or the time slots that are included in at least one SRU of the cellular sidelink resource pool are non-contiguous.

According to some embodiments, the cellular base station is further configured to: select a control channel configuration for SRUs of the cellular sidelink resource pool, wherein the cellular sidelink resource pool configuration information includes information indicating the selected control channel configuration for the cellular sidelink resource pool, wherein according to the control channel configuration for the SRUs of the cellular sidelink resource pool, control channel resources for each SRU are one or more of: non-contiguous in the frequency domain; allocated across multiple frequency sub-channels; or allocated across multiple time slots.

According to some embodiments, the cellular sidelink resource pool is a 3GPP NR V2X sidelink resource pool.

A further set of embodiments may include an apparatus, comprising: a processor configured to cause a first wireless device to: receive cellular sidelink resource pool configuration information, wherein the cellular sidelink resource pool configuration information configures a cellular sidelink resource pool that includes non-contiguous frequency resources; and perform cellular sidelink communication with a second wireless device using the cellular sidelink resource pool that includes non-contiguous frequency resources.

According to some embodiments, the cellular sidelink resource pool configuration information includes a bitmap, wherein each bit of the bitmap indicates whether a corresponding frequency sub-channel is included in the cellular sidelink resource pool.

According to some embodiments, the cellular sidelink resource pool configuration information includes a bitmap, wherein each bit of the bitmap indicates whether a corresponding segment of multiple frequency sub-channels is included in the cellular sidelink resource pool.

According to some embodiments, the cellular sidelink resource pool configuration information further includes a second bitmap, wherein the second bitmap configures which frequency resources are included in the cellular sidelink resource pool per segment.

According to some embodiments, the cellular sidelink resource pool configuration information further indicates a resource unit configuration for the cellular sidelink resource pool, wherein the resource unit configuration includes a number of physical resource blocks (PRBs) that are included in each frequency sub-channel of the cellular sidelink resource pool, wherein the resource unit configuration further includes a number of frequency sub-channels and a number of time slots that are included in each super resource unit (SRU) of the cellular sidelink resource pool.

According to some embodiments, one or more of the frequency sub-channels or the time slots that are included in at least one SRU of the cellular sidelink resource pool are contiguous.

According to some embodiments, one or more of the frequency sub-channels or the time slots that are included in at least one SRU of the cellular sidelink resource pool are non-contiguous.

According to some embodiments, the cellular sidelink resource pool configuration information further indicates a control channel configuration for the cellular sidelink resource pool, wherein according to the control channel configuration, control channel resources are one or more of: non-contiguous in the frequency domain; allocated across multiple frequency sub-channels; allocated across multiple time slots.

A still further set of embodiments may include a first wireless device, comprising: at least one antenna for performing wireless communications; a radio coupled to the at least one antenna; and a processor coupled to the radio; wherein the first wireless device is configured to: receive cellular sidelink resource pool configuration information, wherein the cellular sidelink resource pool configuration information configures a cellular sidelink resource pool that includes non-contiguous frequency resources; and perform cellular sidelink communication with a second wireless device using the cellular sidelink resource pool that includes non-contiguous frequency resources.

According to some embodiments, the cellular sidelink resource pool configuration information includes one or more bitmaps configured to indicate which frequency sub-channels of a plurality of frequency sub-channels are included in the cellular sidelink resource pool.

According to some embodiments, the cellular sidelink resource pool configuration information further indicates a control channel configuration for the cellular sidelink resource pool.

According to some embodiments, according to the control channel configuration for the cellular sidelink resource pool, control channel resources are non-contiguous in the frequency domain.

According to some embodiments, according to the control channel configuration for the cellular sidelink resource pool, control channel resources are allocated across multiple frequency sub-channels.

According to some embodiments, according to the control channel configuration for the cellular sidelink resource pool, control channel resources are allocated across multiple time slots.

A yet further set of embodiments may include a method, comprising: by a first wireless device: receiving cellular sidelink resource pool configuration information, wherein the cellular sidelink resource pool configuration information configures a cellular sidelink resource pool that includes non-contiguous frequency resources; and performing cellular sidelink communication with a second wireless device using the cellular sidelink resource pool that includes non-contiguous frequency resources.

According to some embodiments, the cellular sidelink resource pool configuration information includes one or more bitmaps configured to indicate which frequency sub-channels of a plurality of frequency sub-channels are included in the cellular sidelink resource pool.

According to some embodiments, the cellular sidelink resource pool configuration information further indicates a resource unit configuration for the cellular sidelink resource pool, wherein the resource unit configuration includes a number of physical resource blocks (PRBs) that are included in each frequency sub-channel of the cellular sidelink resource pool, wherein the resource unit configuration further includes a number of frequency sub-channels and a number of time slots that are included in each super resource unit (SRU) of the cellular sidelink resource pool.

According to some embodiments, one or more of the frequency sub-channels or the time slots that are included in at least one SRU of the cellular sidelink resource pool are non-contiguous.

According to some embodiments, the cellular sidelink resource pool configuration information further indicates a control channel configuration for SRUs of the cellular sidelink resource pool, wherein according to the control channel configuration for the SRUs of the cellular sidelink resource pool, control channel resources for each SRU are one or more of: non-contiguous in the frequency domain; allocated across multiple frequency sub-channels; allocated across multiple time slots.

According to some embodiments, the cellular sidelink resource pool is a 3GPP NR V2X sidelink resource pool.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a processor configured to cause a cellular base station to:
   select a resource unit configuration for a cellular sidelink resource pool, including:
   selecting a number of physical resource blocks (PRBs) that are included in each frequency sub-channel of the cellular sidelink resource pool; and
   selecting a number of frequency sub-channels and a number of time slots that are included in each super resource unit (SRU) of the cellular sidelink resource pool;
   select the cellular sidelink resource pool, wherein the cellular sidelink resource pool includes non-contiguous frequency resources; and
   provide cellular sidelink resource pool configuration information to a wireless device, wherein the cellular sidelink resource pool configuration information configures the cellular sidelink resource pool that includes non-contiguous frequency resources, and wherein the cellular sidelink resource pool configuration information includes information indicating the selected resource unit configuration for the cellular sidelink resource pool.

2. The apparatus of claim 1,
   wherein the cellular sidelink resource pool configuration information includes a bitmap, wherein each bit of the bitmap indicates whether a corresponding frequency sub-channel is included in the cellular sidelink resource pool.

3. The apparatus of claim 1,
   wherein the cellular sidelink resource pool configuration information includes a bitmap, wherein each bit of the bitmap indicates whether a corresponding segment of multiple frequency sub-channels is included in the cellular sidelink resource pool.

4. The apparatus of claim 3,
   wherein the cellular sidelink resource pool configuration information further includes a second bitmap, wherein the second bitmap configures which frequency resources are included in the cellular sidelink resource pool per segment.

5. The apparatus of claim 1,
   wherein one or more of the frequency sub-channels or the time slots that are included in at least one SRU of the cellular sidelink resource pool are contiguous.

6. The apparatus of claim 1,
   wherein one or more of the frequency sub-channels or the time slots that are included in at least one SRU of the cellular sidelink resource pool are non-contiguous.

7. The apparatus of claim 1, wherein the processor is further configured to cause the cellular base station to:
   select a control channel configuration for the cellular sidelink resource pool, wherein the cellular sidelink resource pool configuration information includes information indicating the selected control channel configuration for the cellular sidelink resource pool, wherein according to the control channel configuration for the cellular sidelink resource pool, control channel resources are one or more of:

non-contiguous in the frequency domain;
allocated across multiple frequency sub-channels; or
allocated across multiple time slots.

8. The apparatus of claim 1,
wherein the cellular sidelink resource pool is a 3GPP NR sidelink resource pool.

9. A cellular base station, comprising:
at least one antenna for performing wireless communications;
a radio coupled to the at least one antenna; and
a processor coupled to the radio;
wherein the cellular base station is configured to:
  select a resource unit configuration for a cellular sidelink resource pool, including selecting a number of physical resource blocks (PRBs) that are included in each frequency sub-channel of the cellular sidelink resource pool; and
  selecting a number of frequency sub-channels and a number of time slots that are included in each super resource unit (SRU) of the cellular sidelink resource pool;
  select the cellular sidelink resource pool, wherein the cellular sidelink resource pool includes non-contiguous frequency resources; and
  provide cellular sidelink resource pool configuration information to a wireless device, wherein the cellular sidelink resource pool configuration information configures the cellular sidelink resource pool that includes non-contiguous frequency resources, and wherein the cellular sidelink resource pool configuration information includes information indicating the selected resource unit configuration for the cellular sidelink resource pool.

10. The cellular base station of claim 9,
wherein the cellular sidelink resource pool configuration information includes one or more bitmaps configured to indicate which frequency sub-channels of a plurality of frequency sub-channels are included in the cellular sidelink resource pool.

11. The cellular base station of claim 9, wherein the cellular base station is further configured to:
select a control channel configuration for the cellular sidelink resource pool, wherein the cellular sidelink resource pool configuration information includes information indicating the selected control channel configuration for the cellular sidelink resource pool.

12. The cellular base station of claim 11,
wherein according to the control channel configuration for the cellular sidelink resource pool, control channel resources are non-contiguous in the frequency domain.

13. The cellular base station of claim 11,
wherein according to the control channel configuration for the cellular sidelink resource pool, control channel resources are allocated across multiple frequency sub-channels.

14. The cellular base station of claim 11,
wherein according to the control channel configuration for the cellular sidelink resource pool, control channel resources are allocated across multiple time slots.

15. The cellular base station of claim 9,
wherein the cellular sidelink resource pool is a 3GPP NR sidelink resource pool.

16. A method, comprising:
by a cellular base station:
  selecting a resource unit configuration for a cellular sidelink resource pool, including selecting a number of physical resource blocks (PRBs) that are included in each frequency sub-channel of the cellular sidelink resource pool; and selecting a number of frequency sub-channels and a number of time slots that are included in each super resource unit (SRU) of the cellular sidelink resource pool;
  selecting a cellular sidelink resource pool, wherein the cellular sidelink resource pool includes non-contiguous frequency resources; and
  providing cellular sidelink resource pool configuration information to a wireless device, wherein the cellular sidelink resource pool configuration information configures the cellular sidelink resource pool that includes non-contiguous frequency resources, and wherein the cellular sidelink resource pool configuration information includes information indicating the selected resource unit configuration for the cellular sidelink resource pool.

17. The method of claim 16,
wherein the cellular sidelink resource pool configuration information includes one or more bitmaps configured to indicate which frequency sub-channels of a plurality of frequency sub-channels are included in the cellular sidelink resource pool.

18. The method of claim 16,
wherein one or more of the frequency sub-channels or the time slots that are included in at least one SRU of the cellular sidelink resource pool are non-contiguous.

19. The method of claim 16, further comprising:
the cellular base station:
  selecting a control channel configuration for SRUs of the cellular sidelink resource pool, wherein the cellular sidelink resource pool configuration information includes information indicating the selected control channel configuration for the cellular sidelink resource pool, wherein according to the control channel configuration for the SRUs of the cellular sidelink resource pool, control channel resources for each SRU are one or more of:
non-contiguous in the frequency domain;
allocated across multiple frequency sub-channels; or
allocated across multiple time slots.

20. The method of claim 16,
wherein the cellular sidelink resource pool is a 3GPP NR sidelink resource pool.

* * * * *